United States Patent [19]

Schulz

[11] Patent Number: 5,431,702
[45] Date of Patent: Jul. 11, 1995

[54] WASTE CONVERSION PROCESS AND PRODUCTS

[75] Inventor: Helmut W. Schulz, Harrison, N.Y.

[73] Assignee: Dynecology, Inc., Harrison, N.Y.

[21] Appl. No.: 242,532

[22] Filed: May 13, 1994

Related U.S. Application Data

[63] Continuation-in-part of Ser. No. 37,086, Mar. 25, 1993, abandoned.

[51] Int. Cl.⁶ .......................... C10L 5/14; C10L 5/46
[52] U.S. Cl. ........................................ 44/552; 44/577; 44/578; 44/580; 44/590; 44/596; 44/597
[58] Field of Search ................. 44/552, 590, 577, 596, 44/578, 597, 589, 580

[56] References Cited

U.S. PATENT DOCUMENTS

| | | |
|---|---|---|
| 3,506,414 | 4/1970 | Skendrovic ........................ 44/589 |
| 3,910,775 | 10/1975 | Jackman ............................ 44/589 |
| 4,049,391 | 9/1977 | Marsh ................................ 44/589 |
| 4,152,119 | 5/1979 | Schulz ............................... 44/589 |
| 4,230,459 | 10/1980 | Moreau et al. .................... 44/578 |
| 4,405,332 | 9/1983 | Rodriguez ......................... 44/605 |
| 4,552,666 | 11/1985 | Müller ............................... 44/589 |
| 4,615,711 | 10/1986 | Müller ............................... 44/589 |

Primary Examiner—Margaret Medley
Attorney, Agent, or Firm—Thomas H. Whaley

[57] ABSTRACT

A process is disclosed for time production of fuel pellets or briquettes from sewage sludge solids and municipal solid waste with minimal drying requirements. In one of its more specific aspects, this invention relates to a solid pelleted or briquetted fuel product consisting essentially of sewage sludge solids, waste paper and/or refuse derived fuel, and crushed coal, and to its method of preparation. In still another of its specific aspects, this invention relates to a method for the production of fuel gases from sewage sludge solids and cellulosic wastes.

25 Claims, 1 Drawing Sheet

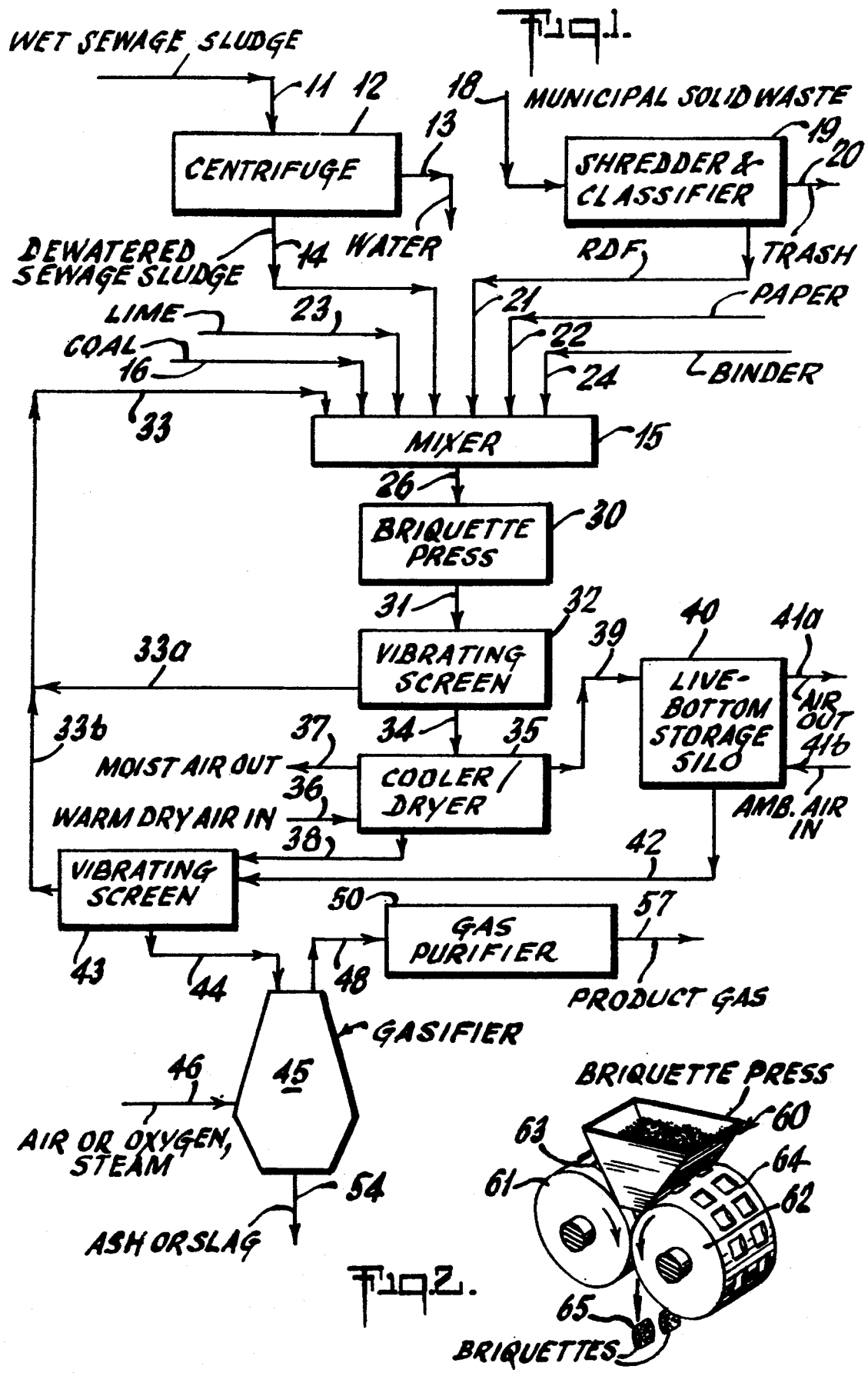

WASTE CONVERSION PROCESS AND PRODUCTS

This application is a continuation-in-part of my co-pending U.S. patent application Ser. No. 08/037,086, filed Mar. 25, 1993, now abandoned.

This invention relates to a process for the production of fuel briquettes from dewatered sewage sludge, paper waste, and refuse derived fuel from municipal solid wastes and to compositions suitable for preparation of such briquettes. An important aspect of the process of this invention is the elimination for the need for drying the fuel briquettes even though the dewatered sewage sludge contains 50 to 75 percent by weight water. In one of its more specific aspects, this invention relates to a solid briquetted fuel product consisting essentially of sewage sludge solids, municipal solid waste, and caking coal and to its method of preparation. In still another of its specific aspects, this invention relates to a method for the disposal of sewage sludge, waste paper, and refuse derived fuel from municipal solid waste by conversion of such waste matter to useful energy.

BACKGROUND OF THE INVENTION

Various methods have been disclosed heretofore for the disposal of sewage sludge. For the past several years, it has been customary in areas along the Eastern Seaboard, and particularly in the New York City area, to load sewage sludge into barges which are towed out to sea and dumped into the ocean. Alternative methods of disposal include dewatering the sewage sludge by the use of centrifuges and dumping the dewatered sewage sludge in and fill areas. Dumping at sea is becoming more and more restricted as a disposal method while, at the same time, metropolitan areas are rapidly running out of available land fill sites.

Incineration of sewage sludge solids has been proposed, but is not an attractive method of disposal due to the water content of moist centrifuged sludges or filter cake solids, which typically contain 65 to 75 weight percent water after concentration by conventional filtering or centrifuging methods.

The process of thin invention is designed to help solve the problem of disposition of sewage sludge by converting dewatered sewage sludge, waste paper, and other municipal solid wastes into usable products without the need for a costly drying process.

In one of its specific embodiments, the product comprises briquettes comprising coal. The art of pressing coal into briquettes is well known. The objective has been principally to utilize coal fines by compacting them into a more easily handled and stored fuel. The compaction or pelleting of municipal refuse, together with waste coal products also has been proposed. Jackman, in U.S. Pat. No. 3,910,775, disclosed the briquetting of coal including coal fines with organic wastes. In this patent, minor quantities of acidic coal fines are apparently used for the purpose of reducing the pH of a sewage stream filtered through the prepared briquettes to precipitate phosphates present in the waste water.

My U.S. Pat. Nos. 4,225,457, 4,152,119, 4,052,173, and 5,125,931, incorporated herein by reference and made a part hereof, disclose the production of briquettes from coal with sewage sludge, and from coal and municipal solid wastes, and their gasification in a moving bed solid fuel gasifier.

SUMMARY OF THE INVENTION

This invention provides a process for forming fuel briquettes from a mixture of dewatered sewage sludge (DSS), refuse derived fuel (RDF) obtained from municipal solid waste (MSW), and/or paper waste, optionally including crushed coal and coal fines. A primary object of this invention is to provide a process for forming briquettes from a mixture of such materials without the necessity for pre-drying the components prior to formation of the briquettes.

Product briquettes formed by the process of this invention are especially useful as fuels in existing solid fuel gasifiers and as fuel in direct-fired boilers and furnaces. A preferred fuel composition contains crushed coal including all fines, dewatered sewage sludge, and cellulosic solids from the group consisting of refuse derived fuel and paper waste, and mixtures thereof.

In a specific embodiment of the invention, a mixture of dewatered sewage sludge containing from about 25 to about 50 percent solids by weight is mixed with a sufficient quantity of refuse derived fuel and/or paper waste, and finely divided coal to form a mixture having a moisture content in the range of from about 12 to about 22 weight percent and pressed into fuel briquettes.

In another embodiment, briquettes of dewatered sewage sludge and refuse derived fuel and/or paper waste are made without coal. These may be shipped to the point of consumption, and then used as such or reformulated with finely divided coal into fuel briquettes.

DESCRIPTION OF THE DRAWINGS

FIG. 1 is a diagrammatic illustration of a preferred method of producing and utilizing a solid fuel product from sewage sludge and other municipal solid wastes including waste paper and refuse derived fuel.

FIG. 2 is a simplified perspective view of a typical rotary briquette press suitable for use in the process of this invention.

DETAILED DESCRIPTION OF PROCESS

With reference to FIG. 1 of the drawing, illustrating a preferred embodiment of the process of the present invention, wet sewage sludge containing for example, 3 to 7 percent solids by weight is supplied through line 11 to a dewatering unit 12, suitably in the form of a centrifuge which concentrates the sewage sludge to a solids concentration in the range of 25 to 50 percent by weight. Water separated from the wet sewage sludge is discarded via line 13.

Municipal solid waste from line 18 is supplied to shredder and classifier 19 where dirt, metal, glass, and other inorganic matter is separated from combustible organic matter and discarded through line 20 as trash. The separated combustible organic matter, herein designated "refuse derived fuel", or RDF, is supplied to a mixer 15 through line 21. Shredded dry-milled waste paper is supplied to mixer 15 through line 22. Dewatered sewage sludge (DSS) from centrifuge 12 is passed through line 14 to the mixer 15 where the dewatered sewage sludge is mixed with the RDF and/or waste paper. Crushed or pulverized coal may be supplied through line 16. Additives, e.g. lime if required, are introduced into mixer 15 through line 23. Binders, if needed, may be added to mixer 15 through line 24. Suitable binders include blackstrap molasses, and black liquor from the paper industry. Binder, when required, is introduced into the mixture in an amount equivalent to 3 to 6 percent by weight of the mixture based on the dry weights of all components.

The relative proportions of the RDF and/or paper waste, DSS, coal and binder, if employed, are adjusted such that the water content of the mixture is in the range of from about 12 to about 22 percent by weight. It has been discovered that a moisture content in this range produces strong, compact pellets or briquettes. The optimum moisture content depends upon characteristics of the particular feed materials employed, the relative proportion of each material in the feed mixture, and upon the compaction method. For example, pellet extrusion requires a higher moisture content (up to 22 percent) in the feed mixture in order to prevent charting during extrusion. For typical coal/DSS/RDF mixtures formed into briquettes using a rotary press, the moisture content of the composition discharged from mixer 15 and supplied via line 26 to briquette press 30 is preferably in the range of from about 14 to about 19 weight percent.

The briquettes preferably are formed by pressing the mixture in a forming press 30, preferably a rotary press of the type illustrated diagrammatically in FIG. 2, wherein the composition is formed into briquettes under a pressure in the range of from about 1000 to about 10,000 psi, typically in the range of 3000 to 5000 psi. A suitable press is available from Bepex Corporation, Minneapolis, Minn.

Briquettes leaving the press through line 31 are steaming hot from the energy expended in forming them. It is desirable to permit the freshly pressed briquettes to dry further before use as fuel in a gasifier, primarily to permit the briquettes to develop greater mechanical strength. The briquettes leaving cooler/dryer 35 suitably have a moisture content in the range of 10 to 12 percent by weight.

In a preferred embodiment of the process of this invention, briquettes from press 30 drop via path 31 onto vibrating screen 32 where fines are removed via line 33a for recycle to mixer 15. The briquettes continue via line 34 through cooler/dryer 35 where the briquettes are contacted with ambient or heated atmospheric air from line 36. Briquettes from cooler/dryer 35 are sent via line 39 to storage silo 40 where further drying occurs by means of forced ambient air flowing in through line 41a and out through line 41b. Alternatively or simultaneously, briquettes from cooler/dryer 35 are sent via line 38 to vibrating screen 43 for final removal of fines which are recycled via line 33b to mixer 15. Alternatively or simultaneously, briquettes from storage silo 40 are sent via line 42 to vibrating screen 43 for final removal of fines which are recycled via line 33b to mixer 15. Briquettes from vibrating screen 43 are sent via line 44 to gasifier 45.

In gasifier 45, the briquettes are reacted with air or oxygen and steam from line 46 as disclosed in greater detail in my U.S. Pat. No. 4,225,173. In that system, the briquettes are gasified with oxygen and steam to produce a fuel gas, synthesis gas, or reducing gas comprising carbon monoxide and hydrogen and a small amount of methane. In this arrangement, raw product gas from the top of the gasifier 45 passes through line 48 to a gas purification system 50, known per se in the art, to yield the desired product gas delivered through line 52. Slag or ash discharged from the bottom of the gasifier 45 through line 54. Gasification with oxygen permits slagging of the ash which is desirable when the ash contains environmentally objectionable components, such as heavy metal oxides.

An alternative to gasification of the briquettes with oxygen and steam in a slagging type gasifier as above described, is gasification with air in a Lurgi type "dry bottom" gasifier where the hearth temperature or grate temperature is below the melting point of the ash. Air gasification is desirable from an economic standpoint in situations where the relatively low B.t.u. content product gas may be utilized at the gasifier site. The cleaned raw product gas resulting from gasification with air typically has a B.t.u. content of the order of 70 to 100 B.t.u.'s per standard cubic foot. These gases are suitable as feed to a gas fired turbine for the generation of electric power and steam (cogeneration).

Other gasifiers, such as the Welman Galusha type gasifier, may be used for gasification of the briquettes at pressures in the range of from about 1 to about 10 atmospheres.

FIG. 2 illustrates diagrammatically a preferred form of apparatus for producing briquettes from the moist compositions of dewatered sewage sludge, paper, and/or RDF, and/or coal. In FIG. 2, an above-described composition comprising dewatered sewage sludge is introduced into hopper 60 of a rotary briquette press, generally designated by numeral 30. The briquette press 30 is provided with a matched pair of pressing rolls 61 and 62. Female die elements or pockets 63 and 64 are filled with composition from hopper 60. As the rolls revolve, the pockets 63 in roll 61 mate with corresponding pockets 64 in roll 62 to form molded briquettes 65 of conventional shape.

In one of its specific embodiments, the process of this invention comprises preparing a mixture comprising crushed or finely divided coal mixed with RDF and/or paper waste and dewatered sewage sludge and a binder. A binder selected from the group consisting of black liquor, black strap molasses, anhydrous ligninsulfonate derivatives, brewery wastes, starch wastes, lime, bitumen, and pitch is preferred. The relative proportions of the components are adjusted to produce a mixture with a water content in the range of 12 to 22 weight percent of the total composition, preferably in the range of 14 to 19 weight percent. The composition is pressed into briquettes or pellets.

As used herein, the term "paper waste" connotes waste paper commonly designated as "air dried" or "air dry", but which may contain from 0.5 to 6 weight percent moisture. The term "municipal solid waste" (MSW) is sometimes referred to as "organic solid waste" and usually includes various cellulosic materials, particularly paper, wood, food waste, and often plastics, metal, glass, and dirt. Refuse derived fuel (RDF) recovered from municipal solid waste is substantially free from non-combustible components, and may contain from 5 to 20 percent moisture. "Briquettes" is used herein in its broadest sense to include pellets as small as one half inch minimum dimension to large shapes having a minimum dimension of several inches.

None of the components of the briquettes of this invention normally will require drying prior to forming the mixture from which the briquettes are made. Coal on an "as received" or "air dry" basis typically will contain about 5 to 7 percent moisture by weight and "dry" paper waste may contain as much as about 5 percent moisture. Thus, a mixture of one part dewatered sewage sludge containing about 60 weight percent water, when mixed with one and one half parts paper waste containing 5 percent moisture and two and one half parts coal containing 7 percent moisture, will have a moisture content of about 17 percent by weight. This mixture produces a strong coherent briquette when pressed in a mold at a pressure of 3000 to 5000 psi.

Where the briquettes or pellets are stored (for example, in a silo) prior to gasification, further drying of the briquettes or pellets in ambient or heated air is desirable to enhance mechanical strength of the green briquettes and to inhibit biological activities.

In a preferred embodiment, the present invention is directed to the preparation of shaped articles of manufacture consisting essentially of coal, cellulosic solids selected from the group consisting of paper waste and refuse derived fuel, and sewage sludge solids. It has been found that when such articles are prepared in accordance with the present invention, the ratio of coal to cellulosic solids and sewage solids preferably is in the range of 1:1 to 3:1 depending on the water content of the sewage sludge and that of the paper waste and/or refuse derived fuel (RDF) and coal. In general, the ratio of refuse derived fuel (RDF) and/or paper waste to dewatered sewage sludge (DSS) may range from 1.5:1 to 5:1 or higher. As a general rule, if the ratio of coal to sewage sludge solids and paper solids is less than about 1:1, the pyrolized briquettes are deficient in the structural integrity needed to sustain the desired high gas production rates in the gasifier.

Preferred sizes and shapes of the briquettes are described in U.S. Pat. No. 4,225,457. As disclosed therein, the shape of the extrusions, briquettes, or pellets may be circular or polygonal (either regular or irregular) in cross-section, and may vary in diameter from about three-quarter inch to about six inches or more. Briquettes of similar size may be stamped or pressed in the form of saddles, pillows, hollow cylinders, or doughnuts, for example. It has been found that as compaction pressure in excess of 1000 pounds per square inch (psi) in forming the shaped article can give good results.

Preferably, the compaction pressure is in the range of 1,000 to 10,000 psi. The upper limit on the compaction pressure is not critical but as a practical matter, usually will not exceed 5,000 psi. In general, a rotating cylinder type press is preferred as illustrated in FIG. 2.

As the briquette bed gravitates downward through the upper portions of a moving bed gasifier, all free moisture is evaporated from the briquettes. This drying further strengthens the briquettes while the heat exchange serves to lower the product gas temperature, which is generally desirable. A pillow-shaped briquette about $2 \times \frac{1}{4} \times 2\frac{1}{4} > 1\frac{1}{2}$ inch in size with an initial moisture content, as charged to the gasifier, of about 12 percent is preferred. Substantially lower initial moisture content results in undesirably high product gas temperature. Larger briquettes require a deeper drying zone and longer residence time therein to preserve optimum temperature gradients both vertically in the gasifier bed and internally within each briquette. In general, it is advantageous to employ a pellet or briquette geometry which affords a short route for the diffusion of gases and steam from the pellet or briquette. Novel shapes, such as hollow cylinders, can offer improved gas-to-briquette heat transfer and reduced diffusion lengths for escaping vapor, but such shapes are difficult to fabricate and are generally not as strong as solid briquettes or pellets.

Briquettes and pellets of all types can be produced from cellulosic waste and sewage sludge solids, with or without coal. Caking coals are preferred, but anthracite coals, non-caking bituminous coals, sub-bituminous coals, lignites, or mixtures thereof, may be used in the compositions. When employing non-caking coals, it may be necessary to employ an added binder, such as bitumen or pitch.

The extrusions, briquettes or pellets of the instant invention are specially formulated, designed, and fabricated to serve the functional and operational requirements of a feed material or burden that will enhance the performance of the gasification process described in U.S. Pat. No. 4,225,173. A briquetted mixture of 3.5 parts of coal, 1.0 parts of dewatered sewage sludge (DSS) containing 30 percent solids, and 1.5 parts of refuse derived fuel (RDF) or paper waste produces an energy rich feedstock for conversion to synthesis or fuel gas in a moving burden gasifier. Caking coals, or coal fines, generally considered unsatisfactory for gasification to produce fuel gas or synthesis gas in moving bed gasifiers, may be utilized to advantage in this way. The disposal of waste paper, sewage sludge, and municipal solid waste in a common operation represents a considerable economic advantage for this process. This process transforms materials which are potential pollution problems into an energy resource which, at the same time, enhances the utility of massive reserves of caking coal not generally suited to gasification.

Lime, unslaked or slaked, may be added to the briquette formulation as a binder supplement (for example, in conjunction with sugar-based binders) and as a biostat. Lime also acts as a slag fluxing agent and to some extent as a sulfur getter. When used, the amount of lime is usually in the range of 2 to 5 percent dry weight basis. Crushed dolomite or other limestone may be charged with the briquettes, if desired, to serve as a sulfur getter.

In one of its specific embodiments, the process for fabricating briquettes or pellets comprises the following steps: a primary dewatering of liquid sewage sludge employing either a centrifuge, a rotary vacuum filter, belt filter, or a plate and frame filter press to produce a cake having a solids content in the range of about 25 to about 50 weight percent or more; mixing said filter cake with the requisite amount of crushed coal or coal fines and sufficient refuse derived fuel (RDF) and/or paper waste to produce a mixture having a moisture content in the range of from about 12 to about 22 weight percent, preferably from about 14 to about 19 weight percent suitable for pressing into briquettes, and compacting the mixture into pellets or briquettes, as in Examples 1 to 6.

The resulting briquettes may comprise from about 3 to about 10 weight percent sewage sludge solids, from about 25 to about 40 weight percent cellulosic waste solids selected from the group consisting of paper waste and refuse derived fuel, and from about 45 to about 65 weight percent coal. Optionally, the briquettes may contain from about 3 to about 6 weight percent lime and from about 2 to about 6 weight percent binder. Compositions in the form of bricks, briquettes or pellets useful as fuel consisting essentially of sewage sludge solids, cellulosic waste solids and crushed coal wherein the ratio on a dry basis of coal to cellulosic waste solids and sewage sludge solids is in the range of from about 1:1 to about 3:1 and the ratio on a dry basis of cellulosic waste solids to sewage sludge solids is in the range of from about 3:1 to about 10:1 are useful as fuel.

In another of its specific embodiments, the briquettes are produced from dewatered sewage sludge and waste paper and/or refuse derived fuel as in Examples 7 and 8.

Throughout this application, the term "sewage sludge"

designates the solid components of municipal sanitary sewage including raw undried sewage sludge, dewatered sewage sludge (DSS), and the solids residue, "sewage sludge solids" resulting from drying the sludge (SSS). The term "lignin" as used herein is intended to include those lignin derivatives present in black liquor from the paper industry including lignosulfonates. The term "dewatered sewage sludge" (DSS) as used herein designates sewage sludge from which part of the water has been mechanically removed to concentrate the sewage sludge solids to 25 to 40 percent or more by weight.

The term "briquettes" is intended to cover the compacted articles of the invention regardless of their shape or size and regardless of the method of compacting. As used in the claims, unless otherwise indicated, briquettes includes extrusions, pellets, and other shapes which have been subjected to the requisite compaction pressure.

EXAMPLES 1 to 6

Pillow shaped briquettes approximately 2¼×2¼×1½ inches in size are produced from a blended feed mixture of dewatered sewage sludge, refuse derived fuel and/or shredded waste paper, Eastern bituminous caking coal, lime and a binder as specified in Table I below.

Blending is carried out in a high-speed mixer marketed under the trade name Turbulizer by Bepex Corporation, Minneapolis, Minn. and continuously fed to a Bepex rotary briquetting press by means of a compacting screw feeder. The freshly-pressed briquettes issue from the press onto a vibrating screen which removes any fines for recycle to the mixer. The briquettes then are cooled and drying is begun in stream of ambient or warmed air.

Sewage sludge from the Passaic Valley Sewerage Commission plant in Newark, N.J. is dewatered by centrifugation from 26 to 38 weight percent solids. The coal is ¼"×0 crushed bituminous coal from Pittsburgh Seam No. 8 with a free swelling index of 8.1 from Champion No. 1 mine of Consolidation Coal Company of Pennsylvania containing 5 to 7 percent moisture. Lime, in the form of slaked lime, is employed as a binder supplement, biostat, and fluxing agent.

Binders for these examples are blackstrap molasses (Examples 1 and 2) containing 35 percent water; black liquor from the paper industry (Examples 4 and 6) containing 50 percent water; and Norlig, a commercially available anhydrous form of lignin sulfonate. (Examples 3 and 5).

TABLE I

| | EXAMPLES | | | | | |
|---|---|---|---|---|---|---|
| | 1 | 2 | 3 | 4 | 5 | 6 |
| Dewatered Sewage Sludge (DSS) | | | | | | |
| Parts by weight | 100 | 100 | 100 | 100 | 100 | 100 |
| Parts solids (by wt.) | 26 | 32 | 38 | 32 | 38 | 26 |
| Parts water by weight | 74 | 68 | 62 | 68 | 62 | 74 |
| Refuse Derived Fuel (RDF) | | | | | | |
| Parts by weight | — | — | 150 | 150 | 150 | 300 |
| Wt. % Moisture | — | — | 12 | 12 | 16 | 14 |
| Parts RDF (dry weight) | — | — | 132 | 132 | 126 | 258 |
| Parts water by weight | — | — | 18 | 18 | 24 | 42 |
| Paper Waste (PW) | | | | | | |
| Parts by weight | 150 | 200 | — | — | 100 | — |
| Wt. % Moisture | 5 | 6 | — | — | 5 | — |
| Parts Paper (dry wt.) | 142 | 188 | — | — | 95 | — |
| Parts Water by weight | 8 | 12 | — | — | 5 | — |
| Coal | | | | | | |

TABLE I-continued

| | EXAMPLES | | | | | |
|---|---|---|---|---|---|---|
| | 1 | 2 | 3 | 4 | 5 | 6 |
| Parts Coal by weight | 250 | 250 | 250 | 350 | 300 | 400 |
| Wt. % Moisture | 5 | 7 | 7 | 6 | 6 | 5 |
| Parts Coal (dry wt.) | 238 | 233 | 233 | 329 | 282 | 380 |
| Parts Water by weight | 12 | 17 | 17 | 21 | 18 | 20 |
| Lime | | | | | | |
| Wt. % | 3 | 4 | 5 | 4 | 3 | 5 |
| Parts by weight | 14 | 24 | 28 | 26 | 21 | 45 |
| Binder | | | | | | |
| Weight % binder | 3 | 4 | 4 | 5 | 5 | 6 |
| Wt. % Moisture | 35 | 35 | .5 | 50 | 5 | 50 |
| Parts by weight | 14 | 24 | 22 | 32 | 35 | 54 |
| Parts Water by weight | 5 | 8 | 1 | 16 | 2 | 27 |
| Total Moisture (wt. %) | 18.7 | 17.6 | 17.8 | 18.7 | 15.7 | 18.1 |
| DSS (wt. %) | 19.8 | 21.8 | 19.6 | 16.4 | 15.2 | 14.1 |

TABLE II

COMPOSITIONS (% by wt.)

| | Example | | | | | |
|---|---|---|---|---|---|---|
| Component (wt. % dry) | 1 | 2 | 3 | 4 | 5 | 6 |
| Basic Component Solids | | | | | | |
| Sewage Sludge Solids (SSS) | 6.4 | 7.0 | 9.4 | 6.5 | 7.0 | 3.9 |
| Refuse Derived Fuel (RDF) | 0 | 0 | 32.8 | 26.8 | 23.3 | 38.9 |
| Paper Waste (PW) | 35.0 | 41.5 | 0 | 0 | 17.6 | 0 |
| Coal | 58.6 | 51.4 | 57.8 | 66.7 | 52.1 | 57.2 |
| Ratio Coal to Waste | 1.4 | 1.1 | 1.4 | 2.0 | 1.1 | 1.3 |
| Ratio RDF + PW to SSS | 5.5 | 5.9 | 3.5 | 4.1 | 5.8 | 10.0 |
| Briquettes | | | | | | |
| Sewage Sludge Solids (SSS) | 6.1 | 6.5 | 8.4 | 6.0 | 6.4 | 3.5 |
| Refuse Derived Fuel (RDF) | 0 | 0 | 29.2 | 24.7 | 21.2 | 35.1 |
| Paper Waste (PW) | 33.0 | 8.1 | 0 | 0 | 16.0 | 0 |
| Coal | 55.5 | 47.3 | 51.5 | 61.5 | 47.4 | 51.6 |
| Lime | 3.3 | 4.9 | 6.2 | 4.9 | 3.5 | 6.1 |
| Binder | 2.1 | 3.2 | 4.6 | 3.0 | 5.6 | 3.7 |

In another embodiment of this invention, dewatered sewage sludge (DSS) is compacted with waste paper or partially dried refuse derived fuel (RDF) to form pellets, or briquettes, which may then be shipped to a distant location where they are comminuted, mixed with water and from 1 to 2 parts crushed coal or coal fines to provide a water content in the range of 14 to 18 weight percent, and again compacted to produce a highly desirable feedstock for moving burden gasifiers of the slagging or non-slagging variety.

Alternatively, the pellets of dewatered sewage sludge (DSS) compacted with refuse derived fuel (RDF) and/or paper waste may be utilized as a fuel in a fluidized bed combustor or in a conventional boiler adapted for use of this fuel.

Such pellets or briquettes may comprise from about 7 to about 10 weight percent sewage sludge solids and from about 65 to about 75 weight percent cellulosic waste solids from the group consisting of paper waste and refuse derived fuel. The pellets or briquettes may contain from about 10 to about 11 weight percent lime and from about 4 to about 5 weight percent binder.

The following examples specify formulations appropriate for the production of pellets or briquettes of dewatered sewage sludge and paper or refuse derived fuel (RDF) and for the use of these pellets or briquettes for the production of briquettes of coal, paper and/or refuse derived fuel (RDF), and sewage sludge solids.

EXAMPLE 7

100 parts by weight of a centrifuge cake of dewatered sewage sludge (DSS) containing 35 weight percent solids, 300 parts of paper waste (containing about 5 percent moisture), 40 parts of lime, and 15 parts of Norlig, are mixed in a "Turbulizer" high-speed mixer, and the mixture is fed to a Simon Barron pellet mill where it is to be extruded in the form of 1 inch diameter pellets, broken to 1.5 inch lengths. The extruded pellets pass through a drying tunnel, where they are cooled and dried in a current of heated air to a moisture content of about 10 weight percent.

100 parts of the above-described pellets, 100 parts of crushed caking coal ($\frac{3}{8}''\times 0$), and 10 parts of blackstrap molasses are charged to a "Turbulizer" mixer with sufficient water to provide a water concentration in the range of 14 to 18 percent. The mixture is passed through the high speed mixer with sufficient residence-time to provide for adequate comminution of the dewatered sewage sludge (DSS)/waste pellets. The blended comminuted mixture is fed to a Bepex rotary briquetting press to produce pillow-shaped briquettes, $2.25\times 2.25\times 1.5$ inches in size. The emerging briquettes are cooled in a drying tunnel with a countercurrent stream of ambient air.

EXAMPLE 8

Refuse derived fuel (RDF) comminuted to minus 1 inch, is dried to a moisture content of about 10 percent. 100 parts of dewatered sewage sludge (DSS) centrifuge cake (containing 35 percent solids), 400 parts of the dried refuse derived fuel (RDF), 50 parts of lime, and 20 parts of Norlig binder are charged to a Turbulizer mixer with thorough mixing and blending. The mixture is then fed, by means of a compacting screw feeder, to a Bepex rotary briquetting press and formed into pillow-shaped briquettes, $2.25\times 2.25\times 1.5$ inches in size. The briquettes, which emerge from the press steaming hot, are cooled and partially dried in a countercurrent stream of ambient air.

The resulting briquettes are crushed, mixed with one to two parts caking coal fines per part briquettes, and mixed in a Turbulizer mixer together with 4 percent black liquor (containing about 50 percent ligninsulfonate). Depending on the moisture content of the coal, sufficient water is added so that the moisture content of the blended mixture is in the range of 14 to 18 percent. The resulting mixture is fed by means of a compacting screw feeder to a Bepex rotary briquetting press to form pillow-shaped briquettes of desired size. The steaming hot briquettes issuing from the press are cooled in a tunnel dryer in a stream of countercurrent ambient air.

TABLE III

| Briquette Compositions (wt. % Dry) | | |
| --- | --- | --- |
| | Example | |
| Component | 7 | 8 |
| Sewage Sludge Solids | 9.3 | 7.5 |
| Paper Waste | 76 | 0 |
| Refuse Derived Fuel | 0 | 77.4 |
| Lime | 10.7 | 10.8 |
| Binder Solids | 4 | 4.3 |
| Ratio RDF + PW to SSS | 8.17 | 10.32 |

With reference to the foregoing examples, briquettes containing coal formed in accordance with this invention comprise, on a dry basis, from about 3.5 to about 8.5 weight percent SSS; from about 29 to about 36 weight percent organic solids from the group consisting of RDF and paper waste; and from about 47 to about 61.5 weight percent coal, the balance comprising from about 3 to about 6 weight percent lime and from about 2 to about 6 weight percent binder solids.

Briquettes formed without coal (Examples 7 and 8) typically contain from about 6.5 to about 7.5 weight percent sewage sludge solids; about 65 to about 75 weight percent cellulosic waste from the group consisting of paper waste and RDF; from about 5 to about 10 weight percent lime; and from about 4 to 4.5 weight percent binder solids.

The exact compositions of product briquettes produced by tile method of this invention are subject to some variation depending upon the moisture contents of dewatered sewage sludge, paper waste, and refuse derived fuel available at the production site. Obviously, the greater the extent of water extraction from the sewage sludge solids, and/or the lower the moisture content of the paper waste or refuse derived fuel, the more sewage sludge solids can be incorporated into the briquette. It is obvious also that paper waste and refuse derived fuel from desert areas will have moisture contents well below 5 weight percent and as low as 0.5 weight percent or less.

I claim:

1. A method for the preparation of a fuel briquette comprising sewage sludge solids, crushed coal, and cellulosic waste solids optionally including a binder which comprises:
   a. forming a mixture of dewatered sewage sludge containing from about 25 to about 50 weight percent solids with comminuted cellulosic waste solids selected from the group consisting of refuse derived fuel containing from about 5 to about 20 weight percent moisture and paper waste containing from about 0.5 to about 6 weight percent moisture in relative proportions such that the ratio of coal to cellulosic waste solids and sewage sludge solids is in the range of from about 1:1 to about 3:1 and the ratio of cellulosic waste solids to dewatered sewage sludge is in the range of from about 1.5:1 to about 5:1 and the moisture content of the resulting mixture is in the range of from about 12 to about 22 weight percent; and
   b. pressing the resulting mixture into briquettes or pellets at a pressure in the range of from about 1,000 to about 10,000 pounds per square inch.

2. A method for the preparation of briquettes consisting essentially of sewage sludge solids and cellulosic waste solids selected from the group consisting of paper waste and refuse derived fuel optionally including a binder which comprises forming a mixture of dewatered sewage sludge containing from about 25 to about 50 weight percent solids with refuse derived fuel containing from about 5 to about 20 weight percent moisture and paper waste containing from about 0.5 to about 6 weight percent moisture in relative proportions in the range of from about 1.5:1 to about 5:1 parts by weight cellulosic waste solids to dewatered sewage sludge and having a moisture content in the range of from about 12 to about 22 weight percent, and pressing the mixture into briquettes or pellets at a pressure in the range of from about 1000 psi to about 10,000 psi.

3. A method according to claim 1 wherein the coal is a bituminous caking coal.

4. A method according to claim 1 wherein the coal is a non-caking coal and the mixture also contains from about 2 to about 6 weight percent bitumen or pitch on a dry weight basis.

5. A method according to claim 1 wherein the mixture of coal, cellulosic waste solids, and sewage sludge also contains from about 3 to about 6 weight percent lime on a dry weight basis.

6. A method according to claim 1 also including on a dry weight basis from 2 to 6 percent binder material selected from the group consisting of molasses, black liquor, lignin sulfonate derivatives, brewery waste, starch wastes, bitumen and pitch.

7. A composition of matter suitable for the preparation of bricks, briquettes or pellets by pressing said composition at a pressure in the range of from about 1000 psi to about 10,000 psi, said composition consisting essentially of dewatered sewage sludge, crushed coal, a binder and cellulosic waste solids selected from the group consisting of paper waste and refuse derived fuel, wherein the ratio of coal to cellulosic waste solids and sewage sludge solids is in the range of from about 1:1 to about 3:1 and the ratio of cellulosic waste to dewatered sewage sludge is in the range of from about 1.5:1 to about 5:1 and having a moisture content in the range of from about 12 to about 22 weight percent.

8. A composition of matter in the form of pressed bricks, briquettes or pellets useful as fuel said composition consisting essentially of sewage sludge solids binder, crushed coal and cellulosic waste solids selected from the group consisting of refuse derived fuel and paper waste wherein the ratio on a dry basis of coal to cellulosic waste solids and sewage sludge solids is in the range of from about 1:1 to about 3:1 and the ratio on a dry basis of cellulosic waste solids to sewage sludge solids is in the range of from about 3:1 to about 10:1.

9. A composition of matter in the form of pressed bricks, briquettes or pellets useful as fuel consisting essentially of sewage sludge solids and cellulosic waste solids selected from the group consisting of paper waste and refuse derived fuel comprising from about 65 to about 75 weight percent cellulosic waste, from about 6.5 to about 7.5 weight percent sewage sludge solids, from about 3 to about 6 weight percent lime, and from about 2 to about 6 weight percent binder.

10. A composition according to claim 8 wherein the composition includes blackstrap molasses as a binder.

11. A composition according to claim 8 wherein the composition includes a lignin sulfonate derivative as a binder.

12. A composition according to claim 8 wherein the composition includes black liquor from the paper industry as a binder.

13. A composition according to claim 7 wherein the composition includes lime.

14. A composition according to claim 9 wherein the composition includes blackstrap molasses as a binder.

15. A composition according to claim 9 wherein the composition includes a lignin sulfonate derivative as a binder.

16. A composition according to claim 9 wherein the composition includes black liquor from the paper industry as a binder.

17. Briquettes formed by the method of claim 1 comprising from about 3 to about 10 weight percent sewage sludge solids, from about 25 to about 40 weight percent cellulosic waste solids from the group consisting of paper waste and refuse derived fuel, from about 45 to about 65 weight percent coal, and from about 2 to about 6 weight percent binder.

18. Briquettes according to claim 17 also including from about 3 to about 6 weight percent lime.

19. Briquettes formed by the method of claim 2 comprising from about 7 to about 10 weight percent sewage sludge solids and from about 75 to about 80 weight percent cellulosic waste solids from the group consisting of paper waste and refuse derived fuel, and from about 4 to about 5 weight percent binder.

20. Briquettes according to claim 19 also including about 10 to about 11 weight percent lime.

21. A method for the production of briquettes comprising coal, sewage sludge solids and cellulosic waste from briquettes produced by the method of claim 2 by comminuting the briquettes with a binder and from about 1 to about 2 parts coal for each part comminuted briquette together with sufficient water to provide a water content in the resulting mixture in the range of 14 to 18 weight percent, and pressing the resulting mixture into briquettes or pellets at a pressure in the range of 3000 to 5000 pounds per square inch.

22. A fuel composition in the form of bricks, briquettes or pellets useful as fuel comprising, in a dry basis, from about 3.5 to about 8.5 weight percent sewage sludge solids, from about 29 to about 36 weight percent cellulosic waste solids selected from the group consisting of refuse derived fuel and paper waste, from about 47 to about 61.5 weight percent crushed coal, from about 3 to about 6 weight percent lime, and from about 2 to about 6 weight percent binder solids.

23. A fuel composition in the form of bricks, briquettes or pellets comprising from about 6.5 to about 7.5 weight percent sewage sludge solids, from about 65 to about 75 weight percent cellulosic waste selected from the group consisting of paper waste and refuse derived fuel, from about 5 to about 10 weight percent lime, and from about 4 to 4.5 weight percent binder solids.

24. A process according to claim 2 wherein the cellulosic waste is paper waste and further including drying of the briquettes to a moisture content of about 10 weight percent.

25. A process according to claim 1 wherein the mixture comprising dewatered sewage sludge, cellulosic waste solids and coal is pressed into briquettes or pellets at a pressure in the range of from about 3000 to about 5000 pounds per square inch.

* * * * *

UNITED STATES PATENT AND TRADEMARK OFFICE
CERTIFICATE OF CORRECTION

PATENT NO. : 5,431,702
DATED      : July 11, 1995
INVENTOR(S) : Helmut W. Schulz It is certified that error appears in the above-identified patent and that said Letters Patent is hereby corrected as shown below:

Column 3, line 58, "4,225,173" should be "4,052,173"

Signed and Sealed this

Sixteenth Day of February, 1999

Attest:

Attesting Officer

*Acting Commissioner of Patents and Trademarks*